UNITED STATES PATENT OFFICE.

SAMUEL C. CHASE, OF CHARLESTOWN, MASSACHUSETTS.

IMPROVED MODE OF COLORING KID GLOVES, &c.

Specification forming part of Letters Patent No. 41,279, dated January 19, 1864.

*To all whom it may concern:*

Be it known that I, SAMUEL C. CHASE, of Charlestown, in the county of Middlesex and State of Massachusetts, have invented a new and useful Improvement in the Process of Treating and Coloring Kid-Skins and Kid Gloves; and I do hereby declare the same to be fully set forth in the following description.

It is a fact well known to those engaged in currying and finishing kid-skins for the manufacture of gloves that immense amounts of time, labor, and money have been expended in the search for a simple, expeditious, and effective means for dyeing or coloring one surface of the skin without effecting a discoloration of the other. The method almost universally adopted by the kid-skin dressers is as follows: After the skins have been manipulated in the usual manner and have reached the stage for being colored or dyed, two of the skins are laid one upon the other with the flesh sides inward, and the edges of the two are then trimmed so as to coincide in contour, and are then cemented or pasted together, so that no liquid can gain access to their internal surfaces. The skins are then dipped one or more times into the mordant bath and allowed to remain the requisite length of time, when they are withdrawn and allowed to dry. They are then transferred to the coloring bath or baths and suffered to remain for several hours or until the desired color is obtained. They are then taken out and dried, and the edges or parts which were cemented together by the adhesive matter are separated or cut off, and the skins are next smoothed out, finished, and glossed. This process is not only a long and tedious one and requires great expertness and care, but causes a great loss or damage to the skins, and, besides, cannot be employed in coloring the skin after it is made up into gloves.

To find a simple and effective means of coloring or dyeing the skin both before and after its manufacture into gloves is the object of my invention, and which after a long series of experiments I have attained.

To enable others skilled in the art to which my invention appertains to make and use my said invention, I will describe its nature and the manner of carrying it out.

In treating a kid-skin for kid gloves in my improved manner I proceed as follows: After the skin has been tanned and manipulated in the usual mode, and when it has reached the stage for being cemented or fastened to another skin, as before mentioned, I take the skin and apply, by means of a brush, to the grain side of it a coating of an alkaline solution consisting of one-half of a pound of sal-soda or its equivalent dissolved in one (wine) gallon of pure warm water. This solution should be filtered or strained and applied while in a warm state. The object of this alkaline coating is not only to open the pores of the skin, but to neutralize any oil or acid contained therein. If we desire a black color, I next apply to the first coating a hydrated solution of sal-soda and logwood; and if the skin is not sufficiently soft and pliable, I add thereto powdered sumac. The proportions of these ingredients, if we desire the skin when finished to be of a jet black on its finished surface, are as follows: one-fourth of a pound of sal-soda or its equivalent, two pounds of logwood, one-half pound of powdered sumac, and one (wine) gallon of water. These are to be steeped in a vessel over a slow fire for about one hour, and then filtered before being applied. It will be evident that the mordant to be used, as well as the coloring material or materials, will depend upon the color which we desire the skin to have when finished. Having applied the two coatings to the skin, it is now ready to receive the coating for imparting to it the desired color. The color of course may be varied, according to the dictates of fancy, and it forms no part of my invention, as the materials used in giving the different shades of color are well known to all practical dyers. If we desire the skin to have a jet-black color, I apply to the coating last applied a coating of a solution of the following: twenty pounds of iron filings, two and one-half pounds of nitric acid, and two (wine) gallons of water. In preparing the same for use I place the iron filings in a tub and pour the nitric acid on the same and allow it to stand for twelve hours, and then add the water and filter, when it is fit for use. I next wipe off all the coloring-matter that has not been absorbed. Next I put on the colored surface a thin coating of oil, (preferring sweet oil,) and finally I apply a coating of a compound hydrated solution of gum-tragacanth and blood, which imparts to the leather a brilliant gloss.

My improved process is especially adapted to kid gloves which have become defaced or discolored, for which I have found it in practice to be exceedingly valuable.

From the above it will be seen that my invention is not limited to any particular color, although I have described my process as applied to but one. I would remark that I use the same process for the production of any desired color, varying, of course, the coloring materials used to produce the color desired.

Having described my invention, what I claim is as follows:

My improved process, substantially as above set forth, for treating and coloring kid-skins or kid gloves.

SAMUEL C. CHASE.

Witnesses:
S. P. WHITE,
T. P. HALL.